Feb. 1, 1966   H. HACK   3,232,118
METHOD AND MEANS FOR THE COMPENSATION OF JOURNALLING
FAULTS IN WORKPIECE-BALANCING OPERATIONS
Filed Aug. 25, 1961   3 Sheets-Sheet 3

United States Patent Office 3,232,118
Patented Feb. 1, 1966

3,232,118
METHOD AND MEANS FOR THE COMPENSATION OF JOURNALLING FAULTS IN WORKPIECE-BALANCING OPERATIONS
Heinrich Hack, Darmstadt, Germany, assignor to Carl Schenck Maschinenfabrik G.m.b.H., Darmstadt, Germany, a corporation of Germany
Filed Aug. 25, 1961, Ser. No. 133,897
14 Claims. (Cl. 73—462)

This is a continuation-in-part of my copending application Serial No. 746,977, now abandoned.

My invention relates to methods and means for determining the unbalance of a rotatable workpiece by joining it with an auxiliary shaft which forms part of a cage, chuck or other workpiece-holding device serving to keep the workpiece in rotation all the proper speed while the unbalance data are being analyzed relative to one or more radial planes of reference.

In such balance analyzing operations, the balancing accuracy depends upon the amounts of any throw or beat due to bearing clearance in the workpiece-holding device. Even with the most conscientious design of such rotatable holding devices tolerances occur which in many cases introduce balancing errors far beyond the range which can satisfy modern exacting balancing needs. Certain methods have heretofore been developed for partially eliminating balancing errors introduced by such tolerances. It has been proposed, for example, to attach to the workpiece an unbalance correcting mass proportional to the product of the unbalance beat movement of the holding device times the weight of the workpiece to be balanced. However, an added corrective amount of unbalance thus determined can be accurate only as long as the workpiece to be balanced have the same weight and if the workpiece-holding device does not vary it clearance or beat movement as to direction and magnitude. For that reason such prior method can be successful only in quantity mass-production of a great number of substantially identical workpieces and only as long as the workpiece-holding device is not separated from the appertaining drive shaft. In this prior method the clearance or play which occurs between the workpiece-holding device and the accurate centering axis of the workpiece is compensated for by resilient tensioning members. Such members, however, function to increase the tolerance of the beat or throw movement by a multiple.

It is an object of my invention to eliminate such deficiencies and to devise a method and means for compensating the effect of journalling errors and frame oscillation errors which may be introduced into the balance test result by the bearings or other mounting of the workpiece on the auxiliary driving shaft during the balance-analyzing operation and by the frame oscillation.

To this end, and in accordance with a feature of my invention, I measure or derive a criterion dependent upon the error introduced into the pickup and then measure or derive another criterion that depends upon the resultant effect of the error plus the unbalance of the workpiece and I then compare the two criteria with each other, such comparison producing a result indicative of the pure unbalance.

In accordance with another feature of my invention, I measure or derive a criterion dependent upon the journalling error, that is, upon any radical clearance and/or planar deviation of the workpiece relative to the precise axis of rotation. I further measure or derive another criterion that depends upon the resultant effect of the same journalling error plus the unbalance of the workpiece, and I then compare the two criteria with each other, such comparison being effected by suitable instrumentalities which produce a mathematical result which is indicative of the pure unbalance.

By virtue of this method, it becomes possible to achieve a very accurate balancing analysis by the employment of a driven auxiliary shaft with the aid of commercially conventional workpiece holders, for example, three-jaw chucks. The method can be performed by employing various types of sensing and translating or transducing devices to derive and transmit the respective criteria; e.g. electrical, pneumatic, hydraulic or other physical means depending upon the particular type of sensing members and comparing devices being used. That is, the deflections of the workpiece alone, at the points which determine its subsequent axis of rotation, and the deflections measured in connection with the workpiece-holding device are converted by translating or transducing devices into electrical, pneumatic or other signals. The deflections or deviations to be sensed may be determined either by transducers mechanically in contact with the workpiece or the workpiece-holding device, or also by sensing devices operating without physical contact with the workpiece, such as inductive or capacitive pickup devices.

The above-mentioned comparison of the individual respective criteria is effected according to the invention in such a manner that by means of a mathematical operation, for example addition, substraction or the like, the components of the critical data derived from and representing only the radial and/or plane deviation are eliminated. The resulting criteria, mathematically derived from the above-mentioned components, are supplied to an indicating instrument.

According to another feature of my invention, representing a preferred embodiment, I effect the above-mentioned comparison of the respective sensed and derived data by means of electric circuitry and I insert into that circuitry one or more compensating potentiometers or rheostats by means of which the differences in the characteristic of the transducing or translating devices as well as the mass ratio of the workpiece to the other masses participating in the unbalance oscillations are compensated for.

According to another perferred feature of the invention, I provide a balancing device in which the auxiliary drive shaft for rotating the workpiece is journalled in an oscillatorily mounting bridge structure which has one or more oscillation pickups rigidly secured to that bridge structure or on a supporting arm rigidly joined therewith; and I further provide one or more other oscillation pickups mechanically separated from the bridge structure. The first-mentioned pickups, rigidly connected with the bridge structure, respond to any journalling error and develop a signal representative of the oscillatory deviation between the center or center-bore of the workpiece and the axis of rotation as a consequence of any dimensioning tolerance or clearance in the bearings supporting the drive shaft. The mechanically separate pickups, on the other hand, serve to respond to, and develop a signal representative of, the oscillatory displacements of the center-of-gravity of the workpiece relative to the axis of rotation, which latter displacement may be shown to be equal to the sum of the displacement due to journalling error plus the deviation due to unbalance inherent in the workpiece. These two signals, after being compensated to eliminate the effect of the co-oscillating mass of the workpiece-holding device and of the bridge structure and also to compensate for the differences in characteristics of the two oscillation pickups, are combined with each other to produce a resulting signal indicative of only the unbalance inherent in the workpiece. This result is then respond to, or indicated by, a suitable instrument.

The above-mentioned and other objects, advantages and features of my invention will be apparent from, and will be mentioned in, the following detailed description in conjunction with the drawings in which.

In the drawings, like reference characters designate corresponding components throughout the several views.

Figure 1:
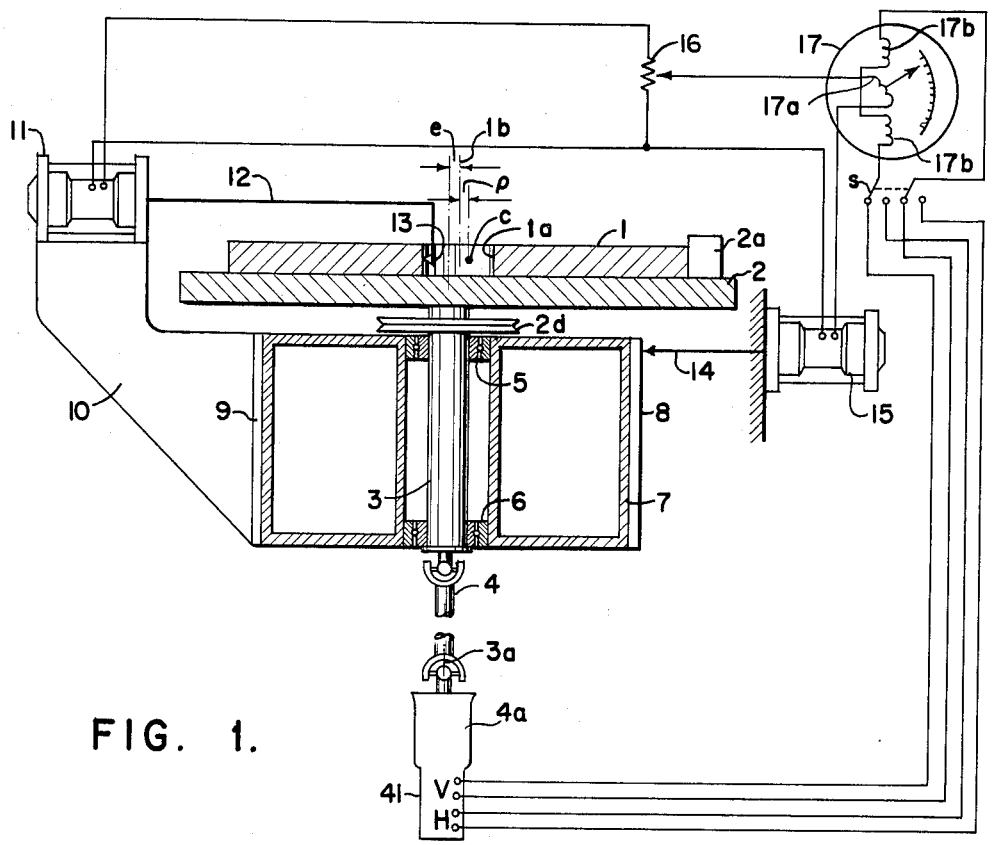
FIG. 1 illustrates a lateral view, partly in section, of a device according to the invention for balancing a workpiece relative to a single correction plane.
Figure 2:
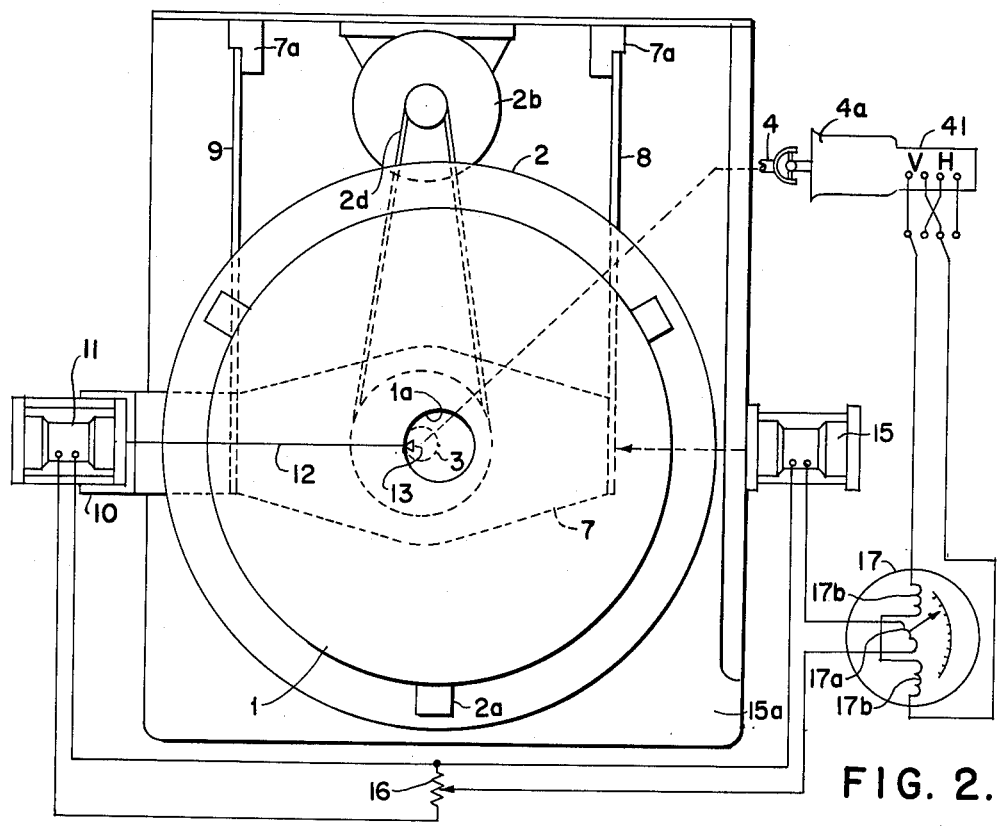
FIG. 2 shows schematically a top view of the embodiment of FIG. 1.

According to FIGS. 1 and 2, the workpiece 1 to be balanced is mounted on the workpiece holder 2, preferably including a three-jaw chuck 2a, of a balancing machine of which only the portion essential to the invention is illustrated. The workpiece holder 2 is mounted on a shaft 3 which is driven from a motor 2b by suitable power transmission means 2d such as a belt and pulley, chain-drive, universal joint, or the like. The shaft 3 is journalled in a rigid bridge structure 7 by means of ball bearings 5 and 6. The bridge structure 7 is secured to the fixed machine frame 7a by means of two leaf springs 8 and 9 each of which has one end fastened to the structure 7 and is elongated in a direction perpendicular to the plane of illustration of FIG. 1, so as to permit the bridge structure 7 together with the workpiece holder 2 and the workpiece 1 to perform lateral oscillations in the horizontal direction and in the plane of illustration of FIG. 1. Rigidly joined with bridge structure 7 is a bracket 10 which supports an oscillation pickup 11 so that the pickup 11 participates in the oscillatory movements of the bridge 7. The pickup 11 is preferably of the moving-coil type controlled by a feeler rod 12 which has a gliding projection 13 in engagement with a concentrically machined surface of the workpiece such as a limb, shoulder or center bore. In the illustrated embodiment the feeler nose 13 is shown to engage a center bore 1a of the workpiece. The pickup 11 thus responds to any radial throw or beat movements of the workpiece 1 in order to convert such beats into an alternating voltage whose phase and amplitude correspond to the amount $e$ of such radial beat movements. This amount $e$ of radial beat movement is indicative of the relative displacement or deviation, i.e. eccentricity, which occurs between the center bore 1a of workpiece 1 and the drive shaft 3 caused by any dimensioning tolerance and/or by clearance in the ball bearings 5 and 6. This amount of deviation or eccentricity $e$ is illustrated in FIG. 1 as the shift of the central axis 1b of bore 1a from the central axis 3a of drive shaft 3, and is sensed by projection 13 in contact with the side wall of bore 1a.

Another feeler 14 engages the bridge structure 7 and transmits the unbalance-responsive oscillations of the bridge structure to another oscillation pickup 15. The pickups are preferably of the electro-dynamic or moving coil type. Pickup 15 is fixedly mounted on the stationary machine frame and translates oscillations from feeler rod 14 into an alternating voltage which corresponds to the oscillatory displacement $\rho$ of the gravity center C of the workpiece 1 relative to the axis 1b of the center bore 1a plus the amount $e$ of radial beat movement. The two pickups 11 and 15 are connected with a wattmetric instrument 17, and a compensating rheostat 16 is interposed between pickup 11 and instrument 17. The connecting circuits are shown only diagrammatically in the figures. The purpose of the compensating rheostat 16 is to eliminate the relationship or effect of the co-oscillating mass of the workpiece-holding device and of the bridge structure, and also the difference between the characteristics of the two oscillation pickups 11 and 15. As a result, the voltage generated in pickup 15 is proportional to the oscillatory displacement of gravity center C from axis 3a, namely $\rho+e$, while the voltage generated in pickup 11 is proportional to the radial deflection $e$ due to journalling error. By connecting the respective two voltages from pickups 11 and 15 in mutual series opposition relative to the wattmeter instrument 17, the voltage from pickup 15 is diminished by the proportional voltage of pickup 11 so that the effect of the journal error magnitude $e$ becomes eliminated from the resultant voltage applied to wattmeter 17 so that the indication on the face of instrument 17 is indicative of only the mass unbalance magnitude $\rho$ inherent in the workpiece.

Figure 4:
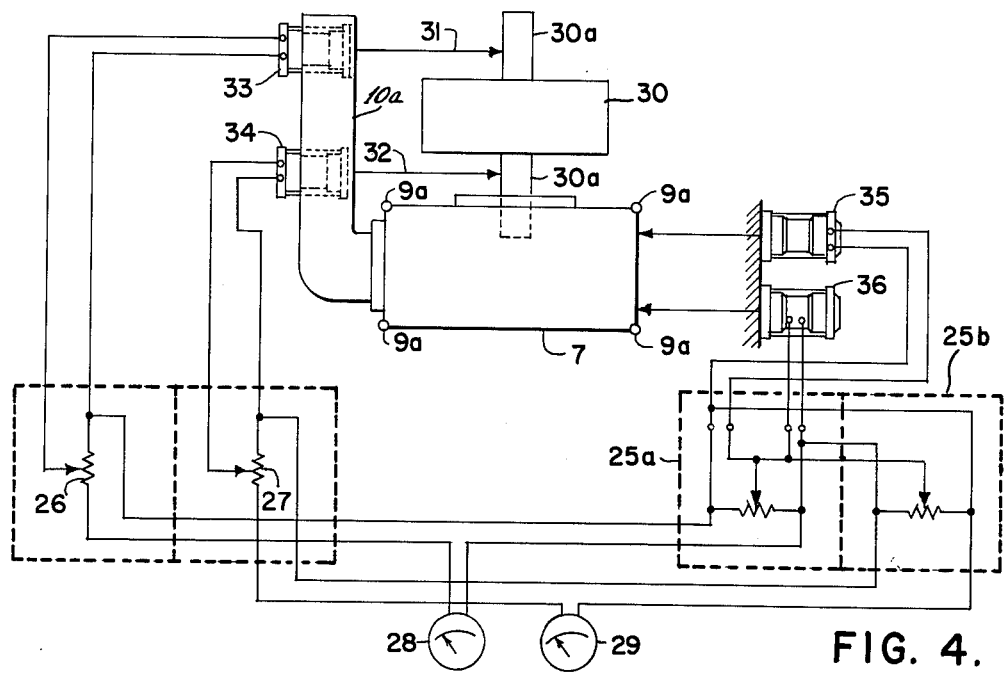
FIG. 4 is a lateral view of a machine according to the invention for balancing in two reference planes instead of in a single plane.

The invention also contemplates the feeler rod 12 and the pickup 11 following the outer periphery of a workpiece or the outer periphery of an annular hub on the workpiece. Measurements in this manner are necessary when the balance workpiece in its usual operation is critical at the outer periphery. An example of a workpiece which is measured with a pickup following the outer periphery thereof is shown in FIG. 4.

The pickups 11, 15 are connected through potentiometer rheostat 16 to the moving coil 17a of the wattmetric instrument 17. The fixed field coils 17b of the same instrument receive phase-reference voltage from a phase transmitter 41 consisting, in the example shown, of a generator 4a driven from the shaft 4 of the workpiece in fixed phase relation to the rotation of the workpiece 1. The generator furnishes two sinusoidal voltages at respective terminal pairs V and H. The two voltages are 90° phase displaced from each other. Only one of them at a time is impressed upon the field coils 17b depending upon whether a selector switch S is placed in position V or H.

By virtue of the operation described above with reference to FIGS. 1 and 2, and depending upon the position of switch S, the instrument indicates one or the other of two components of the unbalance relative to a Cartesian system of coordinates in the generally known manner.

Figure 5:
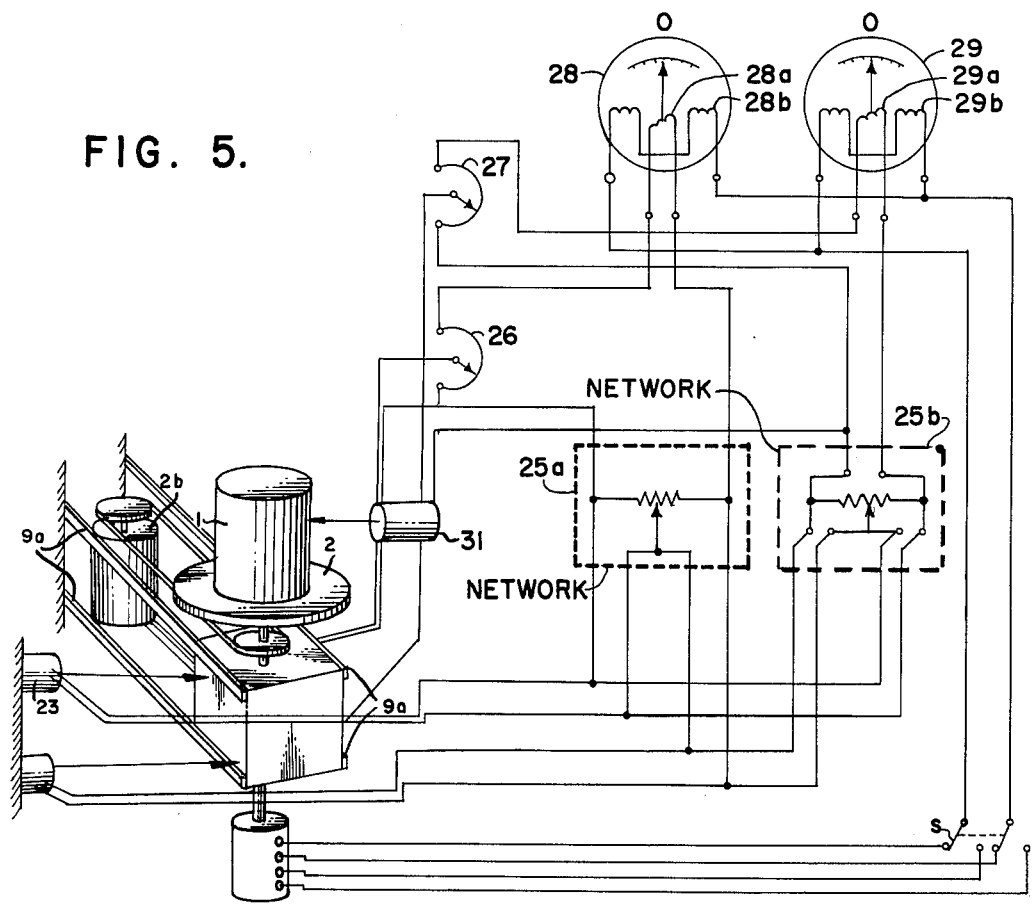
FIG. 5 is a perspective view of a somewhat modified version of the machine of FIG. 4 using a single pickup with two windings instead of two pickups for response to oscillations of the workpiece.

As can be seen in the foregoing a criterion is derived, such as from oscillation pickup 11, which is directly proportional to the value $e$, that is, the radial deviation as determined from oscillation pickup 12, 13 relative to the precise axis of rotation, such as axis 1b illustrated in FIG. 1. Another criterion is then measured by pickup 14, 15 which depends upon the resultant effect of the same journalling error $e$ plus the unbalance $\rho$ of the workpiece ($\rho$ being the distance from the center of gravity C to the axis 1b about which the workpiece will eventually rotate in its end use). The two criteria are then compared with each other, such comparison being effected by suitable instrumentalities, and the resultant is then compared with a reference voltage, such as from the phase transmitter 41 which produces a reference voltage synchronous with and in fixed relation to the workpiece rotation. The mathematical result produced is thus indicative of the distance $\rho$, namely the displacement of the gravity center C from the axis 1b, i.e. a result which is indicative of the pure unbalance of the workpiece 1. The distance $e$ is the amount of radial heat movement between the axis 1b and the center axis of shaft 3. In order to fully understand this criterion $e$, the following considerations should be kept in mind. If the workpiece 1, in its normal operating condition, i.e. not on the balancing machine but when in actual use, is built with its journalling bore in its center, then in such case, in applying the method of the invention, the feeler projection 13 senses the workpiece at the inner wall of this bore 1a, as shown in FIG. 1. However, if the workpiece 1 during its actual operation must be centrally mounted with respect to its outer diameter, then, in order to properly determine the workpiece unbalance, it will be necessary during the balancing run for the feeler to touch the outer periphery of the workpiece 1 for sensing purposes, as is illustrated in FIGS. 4 and 5 by the feelers from respective pickups 31 and 32.

If the center bore 1a of FIG. 1 were perfectly circular and located eccentrically in the body 1, the wattmeter 17 would still show the amount $\rho$ by which the axis 1b is displaced from the gravity center C, regardless of what effect the perfectly circular center bore would have on the value $e$ which is sensed by projection 13 of feeler rod 12 through oscillation pickup 11.

The indicating devices 17, 28, 29 of the balancing machine only indicate oscillations or beat movements which occur in the rotational frequency of the workpiece; otherwise the indicating devices are not suitable for balancing purposes. If the workpiece bore is of elliptical shape, oscillations will be produced at twice the rotation frequency, such oscillations being caused by the large and small axis of the elliptical-shaped bore. The indicating instrument, for example wattmeter 17, will not respond to such oscillations.

All balancing machines of this general type require some filtering means because the vibration pickup furnishes not only a voltage in response to the unbalance oscillations, but also admixed therewith are other spurious voltages resulting from various tolerances or faults, which are inevitably present during the measuring run. In a measuring device of the wattmetric type, the wattmeter itself operates as such a filter because its field coil is excited by a current of a fixed frequency, furnished from the phase reference generator, such as 41, and its moving coil 17a is deflected only in response to the component pickup voltage which has the same frequency. The wattmeter, therefore, does not respond to other frequencies and hence is not deflected by oscillations resulting from an elliptical bore or periphery, because such oscillations have twice the frequency of the one for which the wattmeter is suitable.

In balancing-measuring systems of other types a tuned electrical filter is provided for the same purpose, for selection of the proper frequency. However, such selective function is inherent in the operation of a wattmeter, as above explained, since it operates only if the two wattmeter coils have the same frequency.

In lieu of, or in addition to the wattmetric instrument such as 17, the invention contemplates in all embodiments use of a device which is controlled by the voltage indicative of the value $\rho$ and which in turn controls devices for correcting the unbalance of the workpiece either by marking its axis of rotation or by varying the mass of the rotating body.

Figure 3:
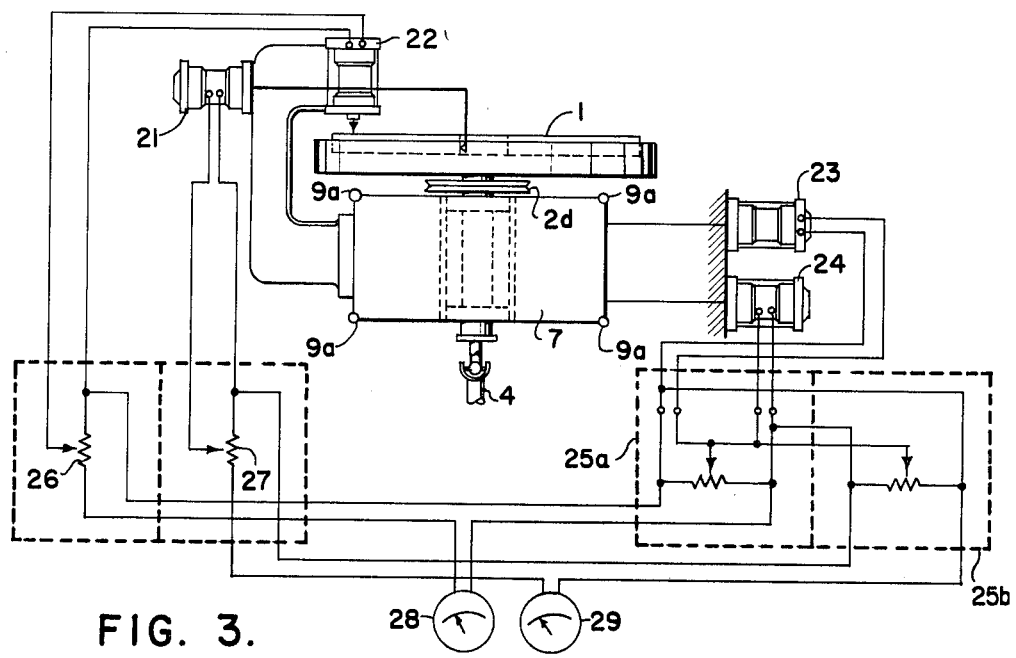
FIG. 3 is a lateral view of another machine according to the invention, for single-plane balancing.

The apparatus illustrated in FIG. 3 serves for response to not only the radial deviation but also the axial deviation of the workpiece from correct journalling. For this purpose an apparatus generally as described above with reference to FIGS. 1 and 2 is equipped with additional oscillation pickups.

Illustrated in FIG. 1 of the present application is the case of a pure balancing with respect to coincidence of the gravity center with the center of rotation. For this purpose, the spindle 3 is guided by two leaf springs 8 and 9 and thus can oscillate in only one direction. The spindle cannot perform any tilting movements.

In the cases of FIGS. 3, 4, 5 and 6, the spindle of the balancing machine is movable in parallel relation to itself and is also capable of performing tilting oscillations. For this purpose, the spindle according to FIG. 5 is mounted with the aid of rod springs 9a. The machines of this type are suitable for balancing in two reference planes, as well as for separately determining dynamic and static un- balance. Radial deviation in FIG. 3 is sensed by a pickup 21, planar or axial deviation is sensed by a pickup 22, and the oscillatory deflections of the bridge structure 7 are sensed in two vertically spaced horizontal planes by means of respective pickups 23 and 24. By means of an electric potentiometer network 25 of conventional type and operation, the voltages generated in pickups 23 and 24 are for example reduced to static and dynamic components; and the voltages generated in pickups 21 and 22 are likewise apportioned by means of two potentiometer devices 26 and 27 so that the instruments 28 and 29 respond only to the oscillatory deviation of the main inertia axis from the axis of rotation of the workpiece, but do not respond to any journalling errors.

The function of the oscillation pickup or transmitter 22 (FIG. 3) is to translate the planar oscillatory motion of the rotor 1 into electric voltages. Of course, the pickup feeler is placed only upon such surfaces which serve for subsequently centering or aligning the rotor. If the rotor body 1 is placed in a slanting position upon the workpiece holder 2, then a sinusoidal alternating voltage will result, having the frequency of the rotor rotation. A wattmetric measuring system can indicate these alternating voltages, or they can be vectorially added together with the voltages of the transmitters 23 and 24. Due to the particularity specifically inherent in the wattmetric measuring method, only voltages or oscillations that are synchronous with the rotor frequency have an effect upon the indication. Since the transmitter 22 is mounted to oscillate together with the rotor 1, neither a radial clearance of the rotor journalling nor a gyratory effect can influence the voltages issuing from the transmitter 22.

The electric circuits of the apparatus according to FIG. 3 are more fully illustrated in FIG. 5 which otherwise corresponds to FIG. 3, except that a single pickup 31 with two output circuits is used instead of the two pickups 21, 22 shown in FIG. 3.

The stationary field coils 28b, 29b of the respective two instruments 28, 29 are excited through the two-position selector switch S by one or the other voltage from phase-reference transmitter 41 operating in the same manner as described above with reference to FIG. 2.

Instrument 28 serves to sequentially indicate two coordinate values indicative of the unbalance effect in the upper reference plane determined by the voltage of the upper pickup 23. Instrument 29 serves to similarly respond to unbalance effects in the lower plane of pickup 24.

The moving coil 28a of instrument 28 reecives a resultant voltage composed of two components. A first voltage component is taken from a potentiometer rheostat 26 and stems from the journalling-fault responsive pickup 31. The second voltage component is supplied from a potentiometric compensating network 25a as conventional in balancing machines. The two component voltages are series opposed so that the resultant voltage impressed upon moving coil 28a is indicative of only the unbalance magnitude but not affected by any journalling error as explained above. The component voltage from network 25a is the result of two primary voltages from pickups 23 and 24, but these are so compensated against each other in the known manner that the output in the circuit of coil 28a is proportional to the voltage of the upper pickup 23 only.

Analogously, the circuit of moving coil 29a of instrument 29 receives voltage from pickup 31 through potentiometer rheostat 27 and series-opposed voltage from compensating network 25b, the latter voltage being indicative only of the unbalance oscillations in the lower plane sensed by pickup 24.

Hence, the two instruments will each indicate one coordinate value of unbalance relative to the upper and lower reference planes of respective pickups 23 and 24 when switch S is in one position, and will indicate the respective other coordinate values in the upper and lower planes when switch S is in the other position, each indication being free from journalling error.

In the cases of FIGS. 3 and 4, the spindle of the balancing machine is movable in parallel relation to itself and is also capable of performing tilting oscillations. For this purpose, the spindle is mounted with the aid of rod springs 9a. The machines of this type are suitable for balancing in two reference planes, or for separately determining dynamic and static unbalance.

In the embodiment shown in FIG. 4, a workpiece-supporting chuck holds and rotates an axled workpiece 30 by its shaft 30a. The workpiece is driven in any desired manner, for example as shown in the embodiments of FIGS. 1, 2 and 3. A pair of sensing members 31 and 32 projecting from the respective oscillation pickups 33 and 34 which are in turn secured to a bridge-mounted carrier arm 10a, check the body 30 at the normal-operation bearing places on the shaft 30a. The two stationary oscillation pickups 35 and 36 determine, in two planes, the measuring values for the oscillations of the bridge 7. The electric utilization of the pickup voltages is effected as in the embodiment of FIG. 3.

Figure 6:
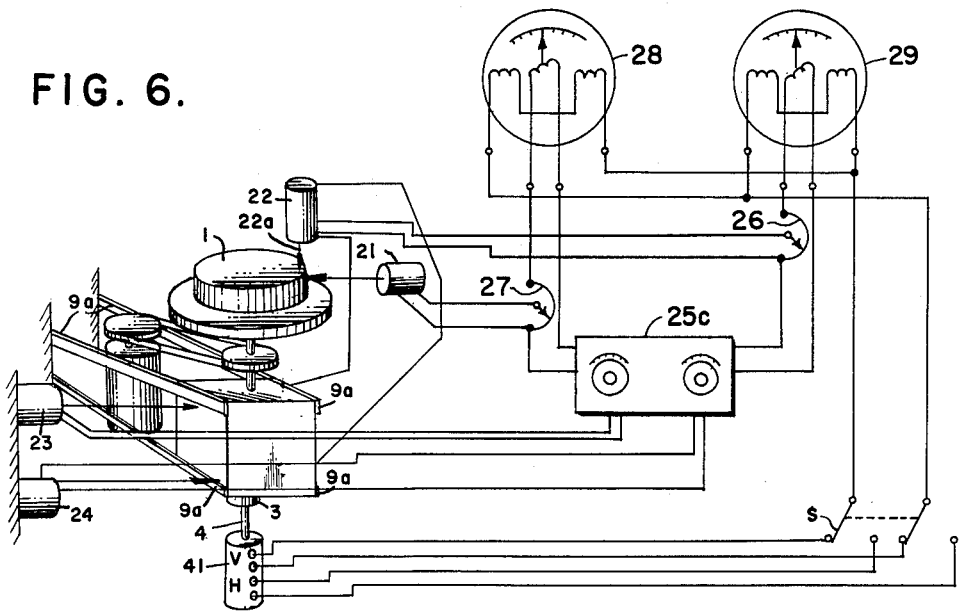
FIG. 6 is a perspective side view and circuit diagram of another modification, somewhat similar to that of FIG. 4.

The modification shown in FIG. 6 is similar to those of FIGS. 3, 4 and 5 and operates in the same manner as described above. The instrument 28 may be used for indicating static unbalance, and the instrument 29 for indicating dynamic unbalance of the workpiece.

The machines according to FIGS. 3, 4 and 6 relate to dynamic balancing in two radial planes of reference. In the universally known manner, the unbalance-responsive oscillations of the balancing-machine bridge 7 are sensed by two pickups 23, 24 (FIGS. 3, 6) or 35, 36 (FIG. 4) and are translated into electric voltages and then transposed to the reference planes by means of the known electric compensating network 25. In the machines of FIGS. 3 and 6, the respective electric networks 25 and 25c are so adjusted that in each case the instrument 29 indicates the static unbalance (error of the gravity center) and the instrument 28 indicates the dynamic unbalance (tumbling error). In accordance with this adjustment, the transmitter (pickup) 21 senses the radial deflection, and the resulting alternating voltage is calibrated through a potentiometer 27 so that it corrects the indication in instrument 29 in the proper order of magnitude. Analogously, the tumbling deflection, which is tantamount to an inclined position of the rotor 1, is translated in transmitter (pickup) 22 into electric voltages which are supplied to the instrument 28 upon being calibrated by the potentiometer 26.

The machine according to FIG. 4 also relates to balancing in two reference planes. The measuring voltages from pickups 35 and 36 are mixed by the network-adjusting device 25d so that the unbalance, separated into the respective components, is indicated in instrument 28 for one of the two reference planes, and is indicated in instrument 29 for the second reference plane.

Accordingly, the two transmitters (pickups) 33 and 34 are oriented only in radial direction and act through the two potentiometers 26, 27 in oposition to the measuring voltages with respect to instruments 28, 29.

It will be apparent to those skilled in the art, upon study of this disclosure, that my invention permits of various modifications and alterations with respect to the individual machine components and method steps disclosed, and hence can be embodied in equipment other than particularly illustrated and described herein, without departing from the essential features of the invention and within the scope of the claims annexed hereto.

I claim:

1. The method of compensating for journalling errors in unbalance measurements on rotating workpieces mounted on driving structure journalled in an oscillatory mount which comprises translating, during rotation of the structure and workpiece, the deviation of the workpiece from the correct journalling axis of the driving structure relative to the mount into a first component physical magnitude, simultaneously translating the overall oscillations of the workpiece relative to a fixed reference into a second component physical magnitude whereby said second magnitude depends upon said deviation as well as upon unbalance inherent in the workpiece, and applying said two component magnitudes against each other to derive a resultant magnitude indicative only of said inherent unbalance.

2. The method of compensating for journalling errors in unbalance measurements on a rotating workpiece journalled on structure having freedom of oscillation in a plane transverse to the rotational axis of the workpiece, which comprises translating during rotation of the workpiece the oscillatory deviation of the workpiece relative to said structure into a first component physical magnitude, simultaneously translating the oscillations of the structure relative to a fixed reference into a second physical magnitude, and measuring a differential value of said two magnitudes as indicative of the workpiece unbalance.

3. The method of compensating for journalling errors in unbalance measurements on rotating workpieces mounted on driving structure journalled in an oscillatory mount, which comprises translating, during rotation of the structure and workpiece, the oscillatory deviation of the workpiece from the correct journalling axis of the driving structure relative to the mount into a first alternating voltage, simultaneously translating the over-all oscillations of the workpiece relative to a fixed reference into a second alternating voltage, measuring a differential resultant of said two voltages as indicative of the workpiece unbalance, and comparing the resultant with a reference voltage synchronous with and in fixed relation to the workpiece rotation, wherby an error-compensated indication of workpiece unbalance is obtained.

4. The method of compensating for journalling errors in unbalance measurements on rotating workpieces mounted on driving structure journalled in an oscillatory mount, which comprises translating, during rotation of the structure and workpiece, the oscillatory deviation of the workpiece from the correct journalling axis of the driving structure relative to the mount into a first alternating voltage, simultaneously translating the oscillations of the driving structure relative to a fixed reference into a second alternating voltage, potentiometrically applying an adjusted portion of one of said voltages against the other voltage so as to obtain a differential resultant voltage indicative of the unbalance inherent in the workpiece, and comparing the resultant with a reference voltage synchronous with and in fixed relation to the workpiece rotation, whereby an error-compensated indication of workpiece unbalance is obtained.

5. Apparatus for determining unbalance of a workpiece, comprising a stationary support, a structure oscillatorily mounted on said support, workpiece-holding means comprising a drive shaft journalled on said structure for imparting rotation to the workpiece, a first transducer mounted on said structure and coactively related to the workpiece on said holding means for response during said rotation to oscillatory deviation of the workpiece due to journalling error, a second transducer mounted on said support and coactively related to said structure for response during said rotation to oscillations of said structure, receiver means for response to workpiece unbalance, said receiver means comprising a phase-reference transmitter connected with said holding means to be driven together with the workpiece and having an alternating output voltage synchronous with said rotation, said two transducers being connected with said receiver means in opposed relation to each other, whereby the response of said receiver means is dependent substantially only upon the inherent unbalance of the workpiece.

6. Apparatus for determining unbalance of a workpiece, comprising a stationary support, a structure oscillatorily mounted on said support, workpiece-holding means comprising a drive shaft journalled on said structure for imparting rotation to the workpiece, a first oscillation pickup firmly mounted on said structure in coactive relation to the workpiece on said holding means and having a voltage responsive to journalling error of the workpiece, a second oscillation pickup firmly mounted on said support in coactive relation to said structure and having a voltage responsive to oscillation of said structure due to journalling error as well as to inherent unbalance of the workpiece, a phase-reference transmitter connected with said holding means to be driven together with the workpiece and having an alternating output voltage synchronous with said rotation, a receiving instrument having a field coil and a moving coil, and circuit means connecting said two pick-ups in mutually opposed voltage relation to one coil of said instrument, said transmitter being connected to the other coil of said instrument, whereby the response of said instrument is indicative substantially only of the unbalance inherent in the workpiece.

7. Apparatus for determining unbalance of a workpiece, comprising a stationary support, a structure oscillatorily mounted on said support, workpiece-holding means comprising a drive shaft journalled on said structure for imparting rotation to the workpiece, a first oscillation pickup having two members movable relative to each other for producing a first voltage, one of said members being firmly mounted on said structure and the other member being engageable with the workpiece on said holding means whereby said voltage is indicative of journalling error, a second oscillation pickup having two members movable relative to each other for producing a second voltage, one of said latter two members being firmly mounted on said support and the other member being engageable with said structure whereby said second voltage is indicative of effects due to journalling error as will as to inherent unbalance of the workpiece, circuit means interconnecting said two pickups in mutually differential relation of said two voltages to produce a resultant voltage indicative substantially only of said inherent unbalance, a phase-reference transmitter connected with said holding means to be driven together with the workpiece and having an alternating output voltage synchronous with said rotation, and instrument means connected with said circuit means and said transmitter for response to said resultant voltage.

8. In unbalance determining apparatus according to claim 7, said circuit means comprising a potentiometer having a displaceable tap contact, at least a portion of said potentiometer being serially connected between one of said pickups and said instrument means, and said potentiometer having at least a portion connected across said other pickup with said voltages of said two pickups in opposed relation to each other along said tapped-off portion.

9. Apparatus for determining unbalance of a workpiece, comprising a stationary support, a structure oscillatorily mounted on said support, workpiece-holding means comprising a drive shaft journalled on said structure for imparting rotation to the workpiece, a first oscillation pickup firmly mounted on said structure in coactive relation to the workpiece on said holding means and having a voltage responsive to journalling error of the workpiece, a second oscillation pickup firmly mounted on said support in coactive relation to said structure and having a voltage responsive to oscillation of said structure due to journalling error as well as to inherent unbalance of the workpiece, a phase-reference transmitter connected with said holding means to be driven together with the workpiece and having an alternating output voltage synchronous with said rotation, a dynamometric instrument having a fixed coil and a moving coil, circuit means connecting one of said coils to said transmitter, and other circuit means connecting said two pickup voltages in mutually opposed relation to said other coil, whereby said instrument responds substantially only to said inherent unbalance.

10. Apparatus for determining unbalance of a workpiece, comprising a stationary support, a structure oscillatorily mounted on said support, workpiece-holding means comprising a drive shaft journalled on said structure for imparting rotation to the workpiece, a first oscillation pickup firmly mounted on said structure in coactive relation to the workpiece on said holding means and having a voltage responsive to journalling error of the workpiece, a second oscillation pickup firmly mounted on said support in coactive relation to said structure and having a voltage responsive to oscillation of said structure due to journalling error as well as to inherent unbalance of the workpiece, a phase-reference transmitter connected with said holding means to be driven together with the workpiece and having an alternating output voltage synchronous with said rotation, a wattmetric instrument having a fixed field coil and a moving coil, circuit means connecting said field coil with said transmitter, a tapped potentiometer having at least a portion thereof connected between said moving coil and said second pickup, said potentiometer having at least a portion connected in parallel relation to said first pickup, the voltages from said respective two pickups being poled in opposition to each other relative to said resistor.

11. Apparatus for determining unbalance of a workpiece, comprising a stationary support, a structure oscillatorily mounted on said support, workpiece-holding means comprising a drive shaft journalled on said structure for imparting rotation to the workpiece, a first oscillation pickup mounted on said structure and having a member oscillatable in a radial plane of said holding means and engageable with the workpiece on said holding means for response to radial journalling errors of the workpiece, a second oscillation pickup mounted on said support and having a member oscillatable in a radial plane of said holding means and in engagement with said structure for response to oscillations of said structure due to journalling error as well as to inherent unbalance of the workpiece, and receiver means to which said two pickups are connected in mutually opposed relation whereby said receiver means responds substantially only to said inherent unbalance.

12. Apparatus for determining unbalance of a workpiece, comprising a stationary support, a structure oscillatorily mounted on said support, workpiece-holding means comprising a drive shaft journalled on said structure for imparting rotation to the workpiece, a group of oscillation pickups comprising two pickups firmly mounted on said structure and 90° displaced from each other relative to an axial plane of said holding means, said first-group pickup having respective oscillatory members engageable with the workpiece on said holding means in radial and axial planes respectively for response to journalling errors in said two planes; and oscillation pickup means firmly mounted on said support and oscillatorily engaging said structure for response to oscillations of said structure due to journalling error as well as to inherent unbalance of the workpiece, two receiving devices, and circuit means for connecting each of said devices with one of said respective first-group pickups in opposed relation to said pickup means.

13. Apparatus for determining unbalance of a workpiece, comprising a stationary support, a structure oscillatorily mounted on said support, workpiece-holding means comprising a drive shaft journalled on said structure for imparting rotation to the workpiece, a group of oscillation pickups comprising two pickups firmly mounted on said structure and 90° displaced from each other relative to an axial plane of said holding means, said first-group pickups having respective oscillatory members engageable with the workpiece on said holding means in radial and axial planes respectively for response to journalling errors in said two planes; a second group of oscillation pickups comprising two pickups firmly mounted on said support and spaced from each other in the axial direction of said holding means, said latter two pickups being in sensing engagement with said structure for response to radial-plane oscillations of said structure due to journalling error as well as to inherent unbalance of the workpiece; two compensating circuits each being connected with one of said respective first-group pickups in voltage-opposed relation to one of said respective second-group pickups; and two receivers connected to said respective compensating circuits.

14. Apparatus for determining unbalance of a workpiece, comprising a stationary support, a structure oscillatorily mounted on said support, workpiece-holding means comprising a drive shaft journalled on said structure for imparting rotation to the workpiece, a group of oscillation pickups comprising two pickups firmly mounted on said structure and 90° displaced from each other relative to an axial plane of said holding means, said first-group pickups having respective oscillatory members engageable with the workpiece on said holding means in radial and axial planes respectively for response to journalling errors in said two planes; a second group of oscillation pickups comprising two pickups firmly mounted on said support and spaced from each other in the axial direction of said holding means, said latter two pickups being in sensing engagement with said structure for response to radial-plane oscillations of said structure due to journalling error as well as to inherent unbalance of the workpiece; two compensating circuits each being connected with one of said respective first-group pickups in voltage-opposed relation to one of said respective second-group pickups; a phase-reference transmitter connected with said holding means to be driven together with the workpiece, said transmitter having an output voltage synchronous with said rotation, two wattmeter receivers each having a fixed field coil and a moving coil, one of said coils of each receiver being connected in one of said respective compensating circuits; and circuit means connecting said transmitter to said respective other coils.

References Cited by the Examiner
UNITED STATES PATENTS

| | | | |
|---|---|---|---|
| 2,338,293 | 1/1944 | Martin | 73—463 |
| 2,383,405 | 4/1945 | Merrill et al. | 73—457 |
| 2,805,576 | 9/1957 | Rambo | 73—466 |
| 3,044,304 | 7/1962 | Ten Bosch et al. | 73—462 |

RICHARD C. QUEISSER, *Primary Examiner.*

ROBERT EVANS, *Examiner.*